Figure 1:
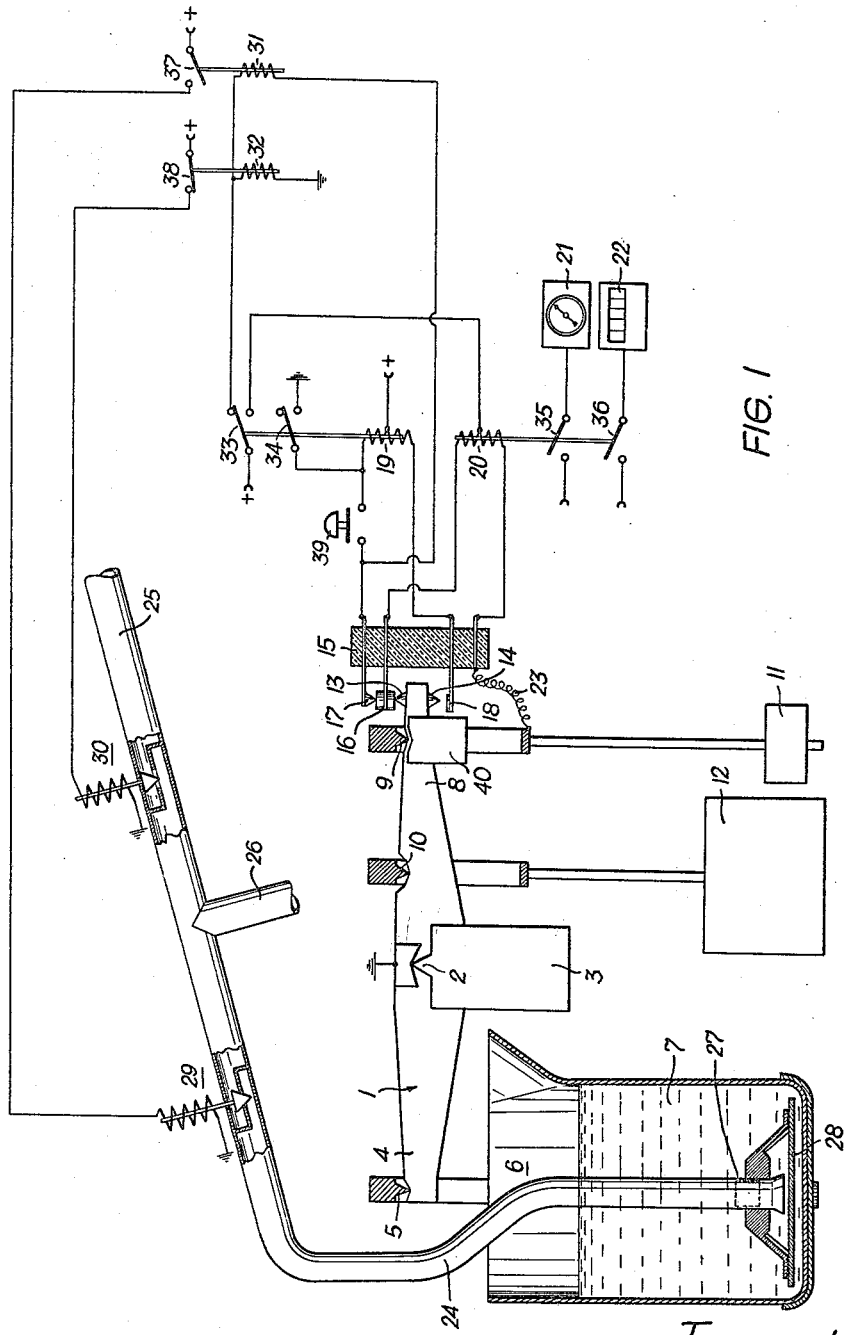

Inventor
Franz Pischinger
By
Watson, Cole, Grindle & Watson
Attys.

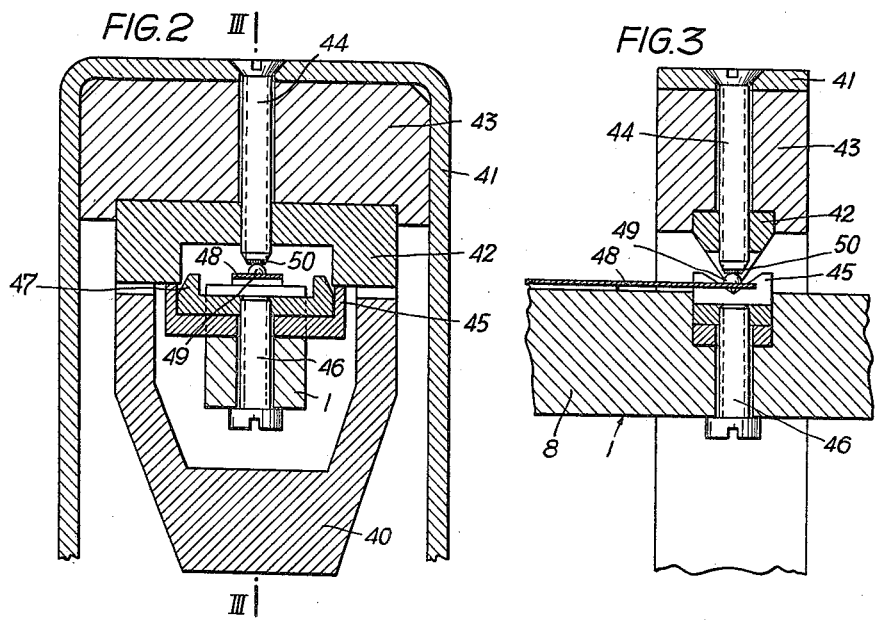
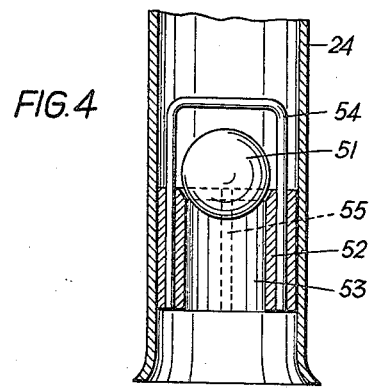
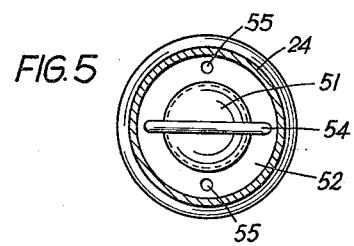

United States Patent Office 3,105,565
Patented Oct. 1, 1963

3,105,565
DEVICE FOR MEASURING THE CONSUMPTION OF LIQUID FUELS
Franz Pischinger, Graz, Austria, assignor to Hans List, Graz, Austria
Filed Mar. 16, 1962, Ser. No. 180,245
3 Claims. (Cl. 177—190)

Devices for measuring the consumption of liquid fuels are used, for example, to determine the fuel consumption of internal combustion engines. According to a known method, the number of revolutions of the main shaft of internal combustion engines is counted during the consumption of a predetermined amount of fuel with the simultaneous measurement of torque. From these data the specific fuel consumption (grams per H.P. per hour) can be easily computed. Other applications are, for example, the measurement of the fuel consumption of an oil burner, the determination of the delivery of a pump, in particular of an injection pump for internal combustion engines, as well as the measurement of the flow of lubricant in a lubrication system.

The invention relates to a device for measuring the consumption of liquid fuels, for example, the fuel consumption of an internal combustion engine with the aid of a balance, the beam of which carries a vessel containing the quantity of fuel to be measured on one arm and two counterweights on the other, as well as electric contacts for the automatic switching on and off of the indicating instruments or measuring devices at the beginning and at the end of the measurement, the one counterweight corresponds to the quantity of fuel to be measured and being arranged on the beam of the balance and detachable from same.

It is the object of the invention to provide an advantageous device for measuring the consumption, which distinguishes itself by great simplicity of construction and operation and permits to achieve great accuracy of measurement.

According to the invention a firm abutment is provided for the lifting of the counterweight corresponding to the amount of fuel to be measured, against which the counterweight abuts when the beam of the balance moves to its position of equilibrium immediately following the switching on of the indicating instruments and/or measuring devices. As a result, the detachable counterweight will be automatically lifted and taken up again by the motion of the beam of the balance which stands still in its position of equilibrium during the whole measuring period. Thus special devices for lifting the counterweight will not be required. Moreover, measuring errors occurring during the movement of the beam of the balance as a result of a delay in switching the indicating instruments or measuring devices on or off are precluded. Consequently, the device according to the invention distinguishes itself by its outstanding simplicity, its greatly improved safety of operation and a high degree of accuracy of measurement.

According to another embodiment of the invention, the contact for switching the indicating instruments and/or measuring devices off can be formed between the beam of the balance and the detachable counterweight, the abutment being electrically insulated against the beam of the balance or the counterweight. This design offers the further advantage that the position of equilibrium attained after the lifting of the counterweight is indicated by the detachment of the weigh-beam from the suspension of the counterweight. The circuit controlling the switch-off of the indicating devices and/or measuring instruments leads through the weigh-beam and the suspension of the counterweight and is retransmitted by the latter via a highly flexible line. The indication of the equilibrium by the relief of contacts is superior to the arrangement where the indication is effected by the closing of contacts, since in this case a relief from pressure or a barely measurable lifting of the contacts will suffice for the relays to respond. This will further increase the accuracy of measurement.

In the last-mentioned embodiment the counterweight corresponding to the amount of fuel to be measured may be located on the weigh-beam by means of a knife-edge bearing. According to a preferred embodiment of the invention a spring contact is provided between the weigh-beam and the detachable counterweight in addition to the knife-edge bearing, said contact being made of a material having a good electric conductivity, such as silver, gold or platinum and separated only after the release of the knife-edge bearing. By this arrangement the knife-edge bearing usually made of hard metal unsuitable for contact making, is relieved of the task of contact-making which is conferred upon a special couple of contacts consisting of a particularly suitable contact material with a low contact resistance. According to a further embodiment of the invention the knife-edge bearing is preferably U-shaped and the spring contact is located between the branches of the U-shaped knife-edge.

Further features and advantages of the invention are explained in detail with reference to an embodiment shown in the accompanying drawings in which FIG. 1 is a diagrammatic representation of the overall arrangement of the device according to the invention, FIG. 2 is a cross-sectional view of a detail of same and FIG. 3 is a cross-section on line III—III of FIG. 2, FIGS. 4 and 5 show another detail in sectional and plan view respectively.

The device according to the invention comprises a balance having a weigh-beam 1, mounted on the knife-edges 2 of a fixed fulcrum 3. At the end of one arm 4 of the weigh-beam 1 a vessel 6 serving as a receptacle for the fuel 7 is provided. The other arm 8 of the weigh-beam 1 carries counterweights 11 and 12, also supported by knife-edges 9 and 10, the counterweight 11 corresponding to the weight of the quantity of fuel to be measured and the other counterweight 12 to the weight of the empty vessel 6 including the residue of fuel still remaining in said vessel after the measurement.

At the end of the arm 8 electrical contacts 13 and 14 are provided co-operating with contacts attached to a fixed insulator 15, namely, contact 13 co-operating with a spring contact 16 which in turn co-operates with a fixed contact 17, and contact 14 located on the underside of arm 8 with yet another contact 18. The contacts 16, 17 and 18 are conductively connected with relays 19 and 20 which serve to start and stop the measuring instruments 21 and 22 required for measuring and to control the inflow and outflow of fuel to and from the vessel 6 respectively. Moreover, the insulator 15 serves as a mounting support for a highly flexible line 23, conductively connecting the counterweight 11 with the relay 20.

For the delivery of the fuel to the vessel 6 and for the removal of the fuel therefrom by suction a freely suspended pipe 24 extends into said vessel, said pipe being connected via a conduit 25 with the fuel tank and via the branch piping 26 with a consumer, such as for example, an internal combustion engine. At the end of the suction pipe 24 a valve 27 is provided in the vessel for the proper control of the flow of fuel through said suction pipe. In order to keep the shocks produced by intermittent delivery of the fuel by the consumer and liable to produce vibrations in the balance, off the bottom of vessel 6, a plate 28 is additionally provided in front of the orifice of the suction pipe 24. The inflow and outflow of the fuel 7 to and from the vessel 6 is controlled by solenoid valves 29 and 30 each actuated by a relay 31 and 32 respectively.

In the arrangement illustrated in FIG. 1 by means of which the specific fuel consumption of, for example, an internal combustion engine can be determined, in the position shown the fuel first flows from the fuel tank (not shown) via conduit 25 through the open solenoid valve 30 and the branch piping 26 to the engine (not shown either). The vessel 6 is filled with fuel and the solenoid valve 29 is closed. The weight of the fuel 7 in the vessel 6 exceeds the counterweight 11 so that the arm 8 of the weigh-beam 1 rests via contact 13 and the spring contact 16 on the fixed contact 17. At that time, the two relays 19 and 20 are de-energized and the switches 33, 34 and 35, 36 respectively actuated by them are kept in the position of rest illustrated in the drawing, by means of springs (not shown). The relays 31 and 32, however, are energized as they are on the one hand, connected via switch 33 with the positive current phase, and on the other hand, the relay 31 is connected with the earthed weigh-beam 1 via contacts 17, 16 and 13, whereas the relay 32 is permanently connected to earth. The relays 31 and 32 are also provided with springs (not shown) which, however, tend to displace the switches 37 and 38 in a position opposed to the one shown in the drawing.

For the starting of the measuring procedure a key 39 is provided, by the operation of which one winding of the relay 19 is energized, the circuit being completed from earth via arm 8 of the weigh-beam 1, contacts 13, 16, 17, the key 39 and the relay 19 to the positive phase. As a result, the switches 33 and 34 are moved into a position opposed to the one shown in the drawing and maintained in said position by the relay 19, since the switch 34 serves as a holding contact. By opening the switch 33 the relays 31 and 32 are de-energized, as a result of which the solenoid valve 29 is opened and the solenoid valve 30 closed. Now the engine (not shown) removes fuel by suction from the vessel 6 via the branch piping 26 and the suction pipe 24. At the same time, the relay 20 is connected with the positive current phase, as a result of which both of its windings are energized. However, since the two coils are energized in counter-sense, the relay 20 stays in its position of rest.

As soon as the weight of the fuel in the vessel 6 drops below the measure determined by the counterweight 11, the contact 16 is first disconnected from contact 17 and then contact 13 from contact 16, as a result of which one winding of relay 20 is de-energized and the second winding closes the two switches 35 and 36. The measuring devices 21 and 22, of which 21 serves to measure time and 22 to count the revolutions of the main shaft, are thus put in operation. During the removal of the fuel by suction from the vessel 6 the weigh-beam 1 moves on account of the counterweights 11 and 12 until the knife-edge 9 of the counterweight 11 abuts against the electrically insulated, fixed abutment 40. Now the weigh-beam 1 remains in its position of rest until such time when the weight of fuel defined by the counterweight 11 has been consumed. Thereupon the arm 8 of the weigh-beam 1 disengages itself from the knife-edge 9 of the weight 11 under the influence of the second counterweight 12. As a result, the connection of the second winding of the relay 20 with earth is interrupted, so that the spring (not shown) cuts the switches 35 and 36 out. As a result, the measuring instruments 21 and 22 also come to a standstill and can be read.

Upon completion of the measurement the solenoid valve 29 stays open and the solenoid valve 30 closed, so that the removal of fuel by suction from the vessel 6 continues. Consequently, the weigh-beam 1 continues to move until contact 14 comes into contact with contact 18 and the circuit of the second winding of the relay 19 is thus closed. Thus the effects of the two windings of the relay 19 cancel themselves out, so that the spring (not shown) can again push the switches 33 and 34 into their position of rest as illustrated in FIG. 1. Thereby the relay 32 is energized, the switch 38 closed and the solenoid valve 30 opened. However, the relay 31 stays de-energized since its connection with earth between the contacts 17, 16 and 13 is interrupted. Consequently, the switch 37 remains closed and the solenoid valve 29 open. The fuel pipe 25 is so dimensioned that now the engine is supplied with fuel via the branch piping 26 and the vessel 6 filled via the suction pipe 24. As soon as the vessel 6 is filled with an adequate supply of fuel, the arm 8 of the weigh-beam comes again to rest on the fixed contact 17 via contacts 13 and 16, as a result of which the relay 31 is connected to earth and consequently, the switch 37 is opened and the solenoid valve 29 closed. Thus the position of rest has been attained again and fuel is supplied from the tank to the engine via the conduit 25, the solenoid valve 30 and the branch piping 26. The system is thus again ready for operation and another measuring procedure can be initiated by merely pressing the key 39.

As already pointed out, the contact 16 rests on a spring slightly prestressed towards the contact 13. As a result of this precaution, a short time (lag) will elapse after the measuring process has been initiated by pressing the key 39 before the measuring instruments 21 and 22 are switched on by disengagement of contact 13 from contact 16. During that time the removal of fuel switched over from the tank to the measuring vessel will stabilize so that measuring errors will be avoided.

In lieu of the switching arrangement as illustrated in FIG. 1 any other circuit scheme can be used within the scope of the invention, such as for example, contacts 13, 14 and 16 through 18 controlling electronic valves or semiconductors of minimum ratings. The number of contacts and their arrangement in relation to the weigh-beam 1 can be chosen or altered to suit individual requirements. Finally, the number and type of measuring instruments used may also differ in individual cases.

Since contact making with hard metal knife-edges of the type used preferably also for the suspension of the counterweight 11, is not of the same high quality as with silver, gold, platinum or similar contact materials, the knife-edge 9 is relieved of its contact-making function by a particular design of the suspension of the counterweight 11 as illustrated in FIGS. 2 and 3, said function being transferred to a contact couple made of any of the above-mentioned materials. In that case, the suspension of the weight 11 comprises a frame 41 encompassing the arm 8 of the weigh-beam 1, to which the U-shaped knife-edge 42 is attached through the intermediary of a spacer 43 by means of a bolt 44. The knife-edge 42 rests in sockets 45 of the weigh-beam 1 to which they are fixed by means of a bolt 46. Between the sockets 45 a chamfered number 47 also mounted on the weigh-beam 1 by means of the bolt 46 is provided between the sockets 45 for the purpose of entering the U-shaped knife-edge 42. As appears from FIG. 2, the abutment 40 is also U-shaped.

Between both branches of the U-shaped knife-edge 42 a contact 49, made for example of silver, gold, or platinum is provided on a laminated spring 48 attached to the weigh-beam 1, the opposite contact being formed by the extremity 50 of the bolt 44, said extremity having also a coating of silver, gold, platinum or the like. When the weight 11 is lifted by the fixed abutment 40, the knife-edge bearing 42 will disengage itself first, whereas the contacts 49, 50 will be separated a little later on account of the prestressing of the laminated spring 48. Inversely, the contact 49, 50 closes already before the knife-edge 42 engages the sockets 45.

Finally, FIGS. 4 and 5 show a variant of the valve provided in the vessel 6 at the end of the suction pipe 24. The same comprises a ball retaining valve having a ball 51 and a perforated insert 52, the bore 53 of which is closed by the ball 51 in its position of rest. A fitting 54 is provided for the purpose of preventing the ball 51 from being dislodged too far away from its seat. In the walls of the insert 52 channels 55 are provided, defining a throttling section for the passage of fuel with the ball valve closed. This will preclude hasty filling and overfilling of the vessel 6, since fuel can be delivered through the channels 55 only. However, when fuel is removed by suction from the vessel 6 the ball valve will open immediately, so that the uncovered cross-section of the bore 53 ensures positive removal of fuel by suction even at high discharge velocities.

I claim:

1. A device for measuring the consumption of liquid fuel, in particular the fuel consumption of an internal combustion engine, comprising a balance having a weigh-beam, a vessel containing the amount of fuel to be measured, said vessel being suspended on one arm of the weigh-beam, two counterweights mounted on the other arm of the weigh-beam, a fuel feed pipe projecting into the vessel and having valves therein controlled to maintain the vessel filled, a plurality of fixed contacts and electrical contacts on said weigh-beam for starting and stopping measuring instruments at the beginning and at the end of the measurement, one of said counterweights corresponding to the amount of fuel to be measured and being detachably mounted on said weigh-beam, a fixed abutment serving to lift the last-mentioned counterweight from said weigh-beam, the last-mentioned counterweight abutting against said abutment while the weigh-beam moves into its position of equilibrium immediately following the actuation of the said contacts for the starting of the measuring instruments.

2. A device as claimed in claim 1, wherein a knife-edge bearing is provided, the counterweight corresponding to the amount of fuel to be measured being suspended from the weigh-beam by means of the said knife-edge bearing, a spring contact made of a metal of good electric conductivity selected from the group consisting of silver, gold and platinum and being provided between the weigh-beam and the detachable counterweight in addition to the knife-edge bearing, said spring contact being separated only after the disengagement of the knife-edge bearing.

3. A device as claimed in claim 1, wherein a knife-edge bearing is provided, the counterweight corresponding to the amount of fuel to be measured being suspended from the weigh-beam by means of the said knife-edge bearing, a spring contact made of a metal of good electric conductivity selected from the group consisting of silver, gold and platinum and being provided between the weigh-beam and the detachable counterweight in addition to the knife-edge bearing, said spring contact being separated only after the disengagement of the knife-edge bearing, the knife-edge bearing being U-shaped and the spring contact is located between the two branches of the U-shaped knife-edge.

References Cited in the file of this patent

UNITED STATES PATENTS

| | | |
|---|---|---|
| 1,427,760 | Ridge | Aug. 29, 1922 |
| 2,672,754 | Kent | Mar. 23, 1954 |